United States Patent [19]
Choi

[11] Patent Number: 5,744,036
[45] Date of Patent: Apr. 28, 1998

[54] PLEATED FILTER ARRANGEMENT

[75] Inventor: Kyung-Ju Choi, Jefferson County, Ky.

[73] Assignee: AAF International, Louisville, Ky.

[21] Appl. No.: 794,594

[22] Filed: Feb. 3, 1997

[51] Int. Cl.$^6$ ............................................. B01D 27/06
[52] U.S. Cl. ............................. 210/493.5; 210/497.2; 210/499; 156/292; 55/475; 55/500; 55/514; 55/521; 55/524
[58] Field of Search ........................... 210/488, 489, 210/490, 493.1, 493.5, 497.01, 497.2, 499; 55/497, 498, 499, 500, 501, 514, 521, 524, 475; 156/474, 181, 459, 219, 292

[56] References Cited

U.S. PATENT DOCUMENTS

| | | | |
|---|---|---|---|
| 3,752,321 | 8/1973 | McLaren | 210/493 |
| 4,004,899 | 1/1977 | Giacovas | 55/499 |
| 4,488,966 | 12/1984 | Schaeffer | 210/485 |
| 5,064,598 | 11/1991 | Seiler | 264/230 |
| 5,066,400 | 11/1991 | Rocklitz et al. | 210/493.5 |
| 5,084,178 | 1/1992 | Miller | 210/493 |
| 5,098,767 | 3/1992 | Linnersten | 428/182 |
| 5,167,740 | 12/1992 | Michaelis | 156/73.1 |
| 5,240,479 | 8/1993 | Bachinski | 55/103 |
| 5,290,447 | 3/1994 | Lippold | 210/493.1 |
| 5,306,321 | 4/1994 | Osendorf | 55/487 |
| 5,330,057 | 7/1994 | Schiller et al. | 210/497.01 |
| 5,385,669 | 1/1995 | Leone, Sr. | 210/499 |
| 5,417,793 | 5/1995 | Bakula | 210/493.1 |
| 5,417,858 | 5/1995 | Derrick et al. | 210/493.1 |
| 5,417,859 | 5/1995 | Bakula | 210/499 |
| 5,427,597 | 6/1995 | Osendorf | 55/487 |
| 5,531,892 | 7/1996 | Duffy | 210/493.1 |
| 5,636,749 | 6/1997 | Wojciechowski | 210/499 |

*Primary Examiner*—W. L. Walker
*Attorney, Agent, or Firm*—Polster, Lieder, Woodruff & Lucchesi

[57] ABSTRACT

A pleated filter medium arrangement including a sheet of pleated porous filtering media nestingly engaged between adjacent pleats by a pleated sheet of thermobondable plastic screening with preselected facing opposite portions of the screening being heat bonded together.

14 Claims, 3 Drawing Sheets

PLEATED FILTER ARRANGEMENT

BACKGROUND OF THE INVENTION

The present invention relates to a unique and novel pleated filter arrangement and more particularly to a sheet of pleated porous filtering media nestingly engaged by a sheet of thermobondable plastic screening with preselected facing portions of the screening being heat bonded together.

Structures to prevent pleat deformation of pleated filters generally have been long known in the art of filtration, attention being directed to the continuous plastic spacer ribbon of expired U.S. Pat. No. 3,752,321, issued to J. C. McLaren on Aug. 14, 1973; to the wire spacer arrangement of U.S. Pat. No. 4,004,899, issued to A. Giacovas on Jan. 25, 1977; to the teeth spacer arrangement of U.S. Pat. No. 4,488,966, issued to J. L. Schaeffer on Dec. 18, 1984; to the elongated, crossing, spaced ribs on a pleat spacer in U.S. Pat. No. 5,064,598, issued to H. Seiler on Nov. 12, 1991; and, to the porous pleated filter with a porous support layer having spaced polymeric beads disposed in parallel strips thereon as shown in U.S. Pat. No. 5,084,178, issued to J. D. Miller et al on Jan. 28, 1992. Attention is further directed to the micropleat-macropleat and the thermoplastic adhesive structure of U.S. Pat. No. 5,098,767, issued to S. B. Linnersten on Mar. 24, 1992; to the pleat spacer mechanism of U.S. Pat. No. 5,167,740, issued to U. Michaelis on Dec. 1, 1992; to the pleat tip intersecting and parallel pleat separating bead segments of U.S. Pat. No. 5,240,479, issued to T. J. Bachinski on Aug. 31, 1993; to the pleat wall projections in the three U.S. Pat. No. 5,290,447, issued to H. J. Lippold on Mar. 1, 1994, in the U.S. Pat. No. 5,306,321, issued to R. J. Osendorf on Apr. 26, 1994 and in the U.S. Pat. No. 5,427,597, also issued to R. J. Osendorf on Jun. 27, 1995. Finally, attention is directed to the filter frame pleat stabilizing elements which engage filter pleat tips as shown in U.S. Pat. No. 5,531,892, issued to D. R. Duffy on Jul. 2, 1996.

For the most part, these aforementioned pleat spacer arrangements have been comparatively complex in their manufacture and assembly and comparatively inefficient in filter operations, requiring comparatively expensive and complex filter structures in many instances. The present invention provides a unique and novel pleat spacing structure which is straightforward and economical in manufacture and assembly with a comparatively increased rate of production, providing an inventive pleated filter arrangement which is efficient and stable in operation and which requires a minimum of construction parts. Further, the present invention provides a pleated filter structural arrangement which provides comparatively lower initial pressure drop across the filter media, which serves to enhance communicative laminar flow through the pleated filter media walls and which provides for improved pleated media support strength without restricting or limiting fluid passage therethrough.

Various other features of the present invention will become obvious to one skilled in the art upon reading the disclosure set forth herein.

BRIEF SUMMARY OF THE INVENTION

More particularly the present invention provides a pleated filter media arrangement for removing particulate matter from a fluid stream comprising: at least one sheet of porous filter media having opposed faces and being pleated into a plurality of longitudinally extending spaced pleats of porous filter media; at least one sheet of longitudinally extending pleated, thermobondable, plastic screening in nesting relation with and adjacent at least one of the opposed faces of the pleats of porous filter media to separate the pleats with preselected opposed portions of the pleated plastic screening being heat bonded together.

It is to be understood that various changes can be made in one or more of the several parts of the inventive pleated filter arrangement disclosed without departing from the scope or spirit of the present invention. For example, but not limited thereto, flexible plastic screening can be nestingly positioned adjacent both faces of the pleated porous filter media, two or more layers of porous pleated filter media can be employed, and nesting screenings can be thermobonded to the pleated porous filter media on both opposed faces of the porous filter media.

BRIEF DESCRIPTION OF THE SEVERAL VIEWS OF THE DRAWINGS

Referring to the drawings which disclose the several parts of the inventive pleated filter arrangement.

DETAILED DESCRIPTION OF THE INVENTION

Figure 6:
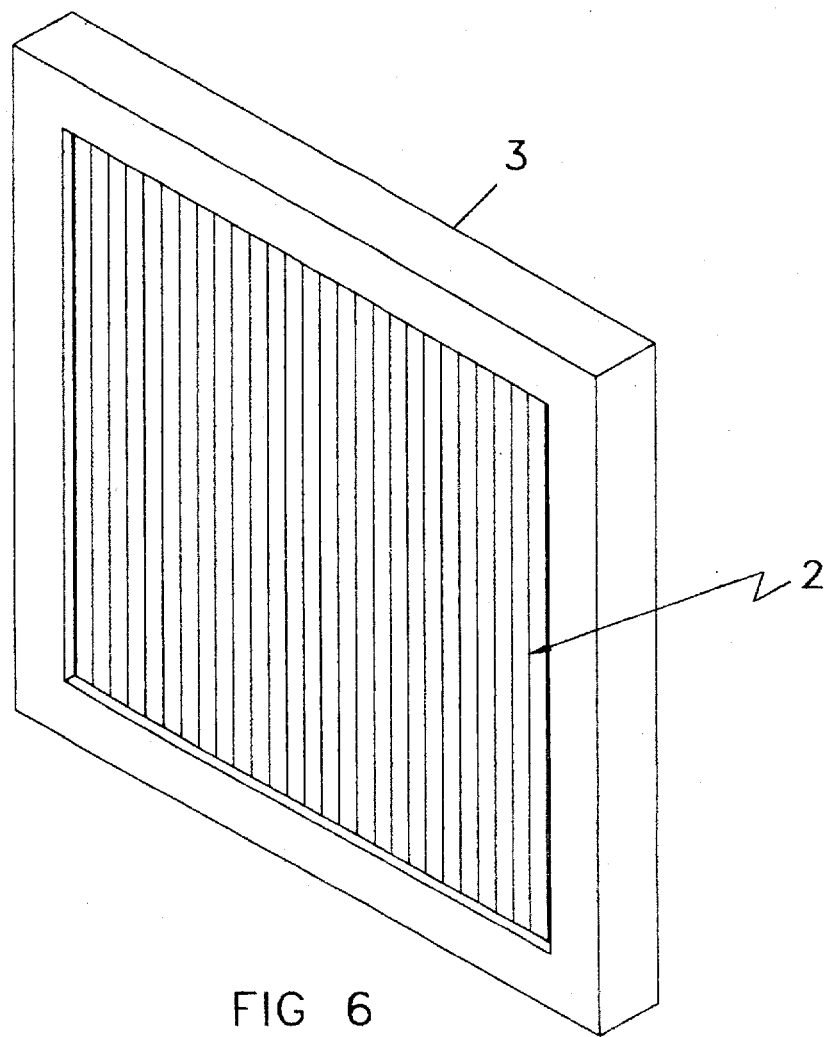
FIG. 6 is an isometric assembly view of a support frame with the inventive pleated filter media arrangement disposed therein.
Figure 7:
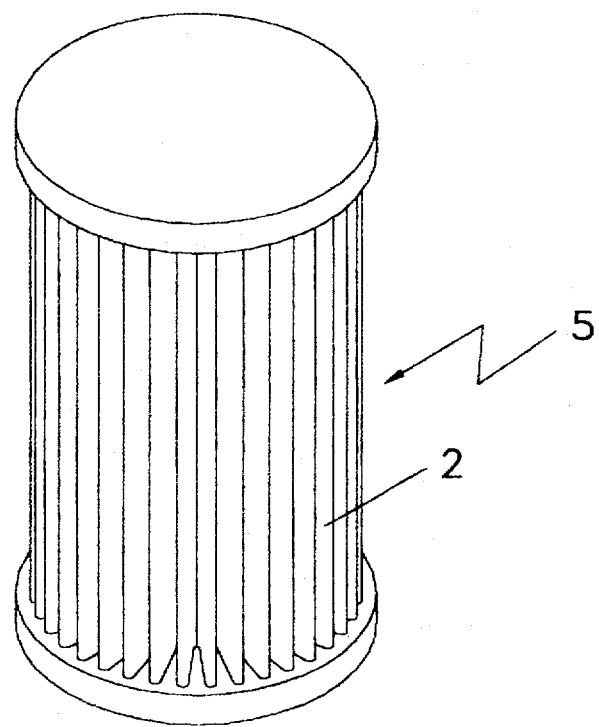
FIG. 7 is an isometric assembly view of a cylindrical cartridge arrangement incorporating the inventive pleated filter media arrangement therein.

Referring to the isometric view of FIGS. 6 and 7 of the drawings, an overall inventive pleated filter arrangement 2 is disclosed as mounted within a suitably sturdy, rectangular flowthrough, support frame 3 (FIG. 6) and cylindrical cartridge frame 5 (FIG. 7) which can be fashioned from any one of several plastic, cardboard or metallic materials.

Figure 5:
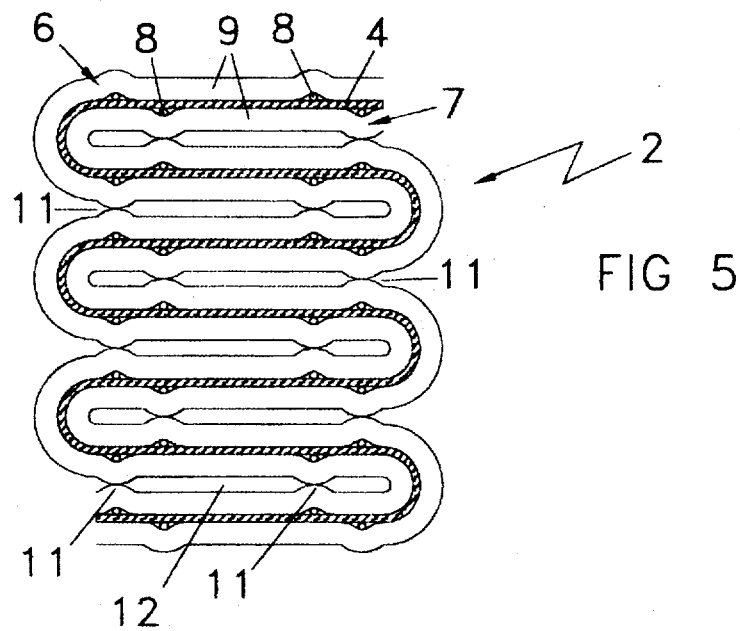
FIG. 5 is an enlarged cross-sectional view of a portion of the inventive pleated filter media arrangement disclosing thermobondable screening nestingly adjacent opposed faces of the pleated filter media with opposed strands of the nesting screen within adjacent pleats being heat fused together.

As can be seen in the cross-sectional view of FIG. 5, the embodiment of the inventive, pleated filter arrangement 2 can include at least one sheet of porous filter media 4 which can be of a suitable glass fiber material or any one or more of several types of porous filter media known in the fluid filtration art such as a synthetic media or a combination of glass fiber and synthetic material. The porous filter media 4 is pleated into a plurality of longitudinally extending spaced pleats of porous filter media having opposed faces and, as can be seen in FIG. 5, a pair of opposed longitudinally extending pleated sheets 6 and 7 of thermobondable screening material, such as a suitable polymeric material, nestingly engage between adjacent pleats of the opposed faces of the pleated filter media 4. The thermobondable screening material can be formed from any one of a number of suitable, sturdy, but somewhat flexible thermobondable materials known in the art and, advantageously, the screening material can be of a suitably blended mixture of polyvinyl acetate and polypropylene plastic materials. It is to be understood that only one pleated nesting sheet of screening material can be employed to nestingly engage between adjacent pleats along only one face of the pleated filter media 4 and that, if desired, such nesting sheet can be heat bonded to the media face or pleated in such a fashion as to be adjacent only a portion of the pleated face of the filter media.

Figure 1:
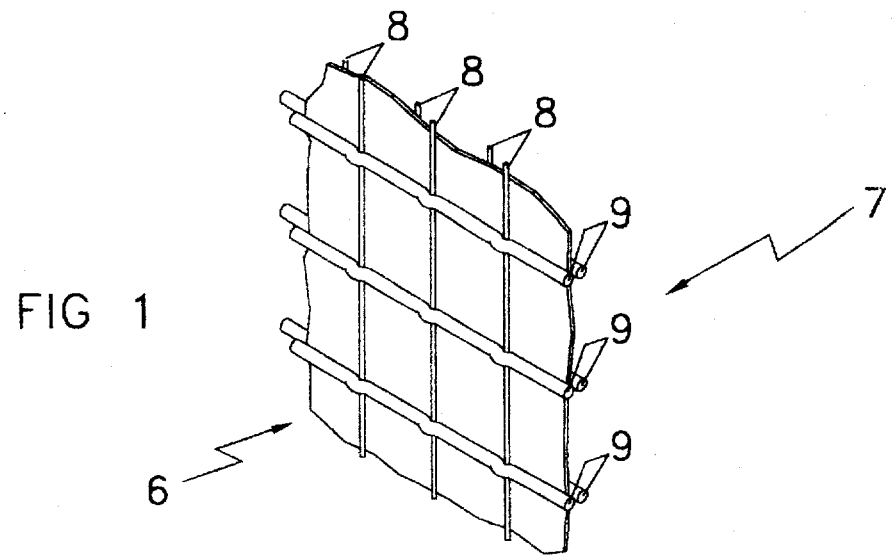
FIG. 1 is an isometric view of a portion of the porous filter media and thermobondable screening adjacent opposed faces of the porous filter media.
Figure 4:
FIG. 4 is an end view of the screening portion of FIG. 2 along lines 4—4 of FIG. 2.
Figure 2:
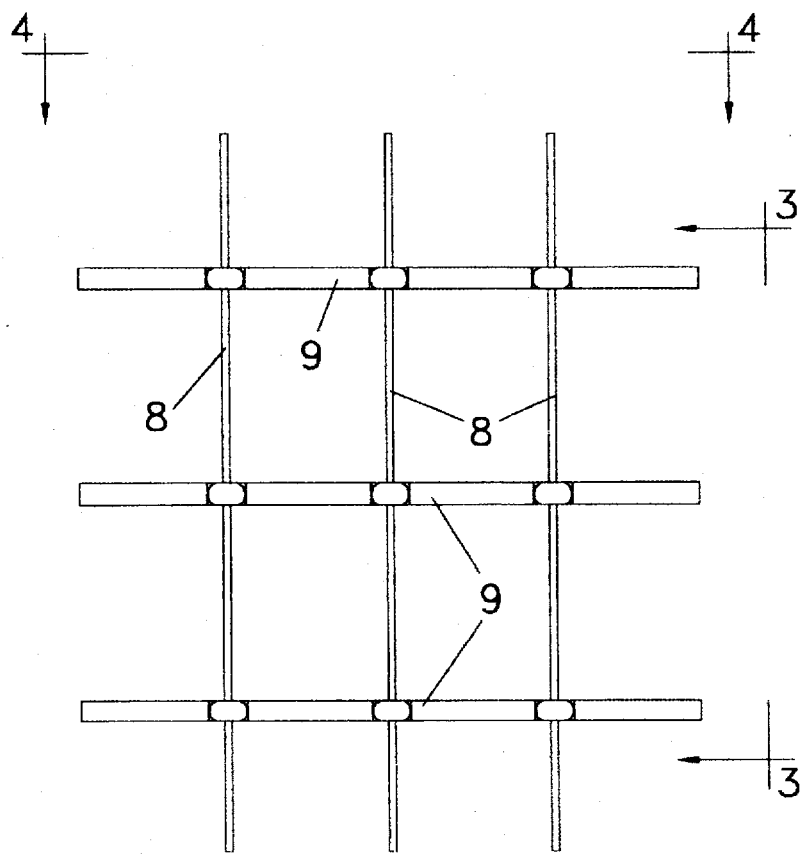
FIG. 2 is an enlarged face view of a portion of the crossing strands of the thermobondable screening.
Figure 3:
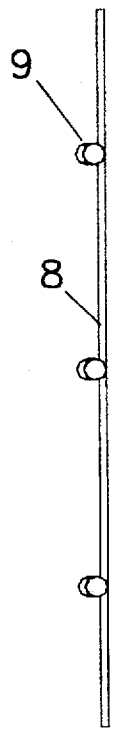
FIG. 3 is a side view of the screening portion of FIG. 2 along lines 3—3 of FIG. 2.

As can be seen in FIGS. 1–4 of the drawings, each of the screening sheets 6 and 7 can be comprised of at least two inner and outer superposed layers of sets of spaced strand layers 8 and 9 respectively with the spaced strands of one layer 8 substantially normal to and crossing the spaced strands of the other layer 9 so as to provide flow-through passages therebetween. Advantageously and as can be seen in FIG. 1 of the drawings, the sets of smaller spaced strands 8 in one of screening sheets 6 and 7 positioned on opposite faces of filter media 4 are offset from the smaller spaced strands 8 in the other screening sheet while the sets of larger spaced strands 9 in both screening sheets 6 and 7 positioned on opposite faces of filter media 4 are directly opposite each other. This arrangement serves to accommodate for direct alignment of larger spaced strands 9 which are directly opposite each other in adjacent pleat faces when the filter media 4 and screening sheets 6 and 7 are arranged in pleated form with the crossing sets of spaced strands 8 and 9 of each pleated screening sheet 6 and 7 providing rectangular flow-through passages therebetween. Advantageously, the spacing of strands in sets 8 and 9 can be such as to provide rectangular flow-through passages of approximately one inch square (1" sq.). In one advantageous embodiment of the present invention, the inner layers of sets of smaller spaced strands 8 on each of screening sheets 6 and 7 are heat bonded to the opposite faces of the filter media 4 with the outer layers of larger spaced strands 9 on each face of filter media 4 when so pleated as to be facing each other between adjacent pleats being abuttingly spot bonded together as shown by reference numeral 11 in FIG. 5, thus providing flow channel communicating spaces 12 therebetween. Further and advantageously, each of the larger spaced strands 9 of the inner and outer layers of each sheet 6 and 7 can have a cross-sectional diameter in the range of approximately one thirty second of an inch (1/32") to one eighth of an inch (1/8") and, advantageously of approximately one twenty-fourth of an inch (1/24") with the cross-sectional diameter of each of the inner layers of spaced offset strands 8 being approximately in the range of one-tenth (1/10) to one half (1/2) the diameter of the outer larger strands 9. In this regard, it is to be understood that the geometric and angular arrangement of the crossing of the strand layers, the spacing of the strands in each layer to provide opposed adjacent strand portions, the number of strand layers and the cross-sectional diameter of crossing strands can be varied in accordance with the nature of the fluid stream to be treated—thus providing the unique and novel pleated filter arrangement in accordance with the disclosure as set forth herein.

The invention claimed is:

1. A pleated filter media arrangement for removing particulate matter from a fluid stream comprising:
    at least one sheet of porous filter media having opposed faces and being pleated into a plurality of longitudinally extending spaced pleats of porous filter media;
    at least one sheet of longitudinally extending, pleated thermobondable plastic screening in nesting relation with and engaging between adjacent pleats along one of the opposed faces of said pleats of porous filter media to separate said pleats with preselected opposed abutting portions of immediately opposed pleat faces of adjacent pleats said pleated plastic screening being heat bonded together.

2. The pleated filter media arrangement of claim 1, said porous filter media being glass fiber.

3. The pleated filter media arrangement of claim 1, said porous filter media being synthetic.

4. The pleated filter media arrangement of claim 1, said porous filter media being a combination of glass fiber and synthetic media.

5. The pleated filter arrangement of claim 1, said thermobondable plastic screening being of polymeric material.

6. The pleated filter media arrangement of claim 1, said plastic screening being a polyvinyl acetate and polypropylene blend.

7. The pleated filter media arrangement of claim 1, and a surrounding flow-through support frame.

8. The pleated filter media arrangement of claim 1, said plastic screening being nestingly engaging adjacent pleats along both of said opposed faces of said pleats, of porous media.

9. The pleated filter media arrangement of claim 1, said pleated plastic screening comprising at least two inner and outer superposed layers of spaced strands with the spaced strands of one layer crossing the spaced strands of the other layer to provide fluid flow-through passages therebetween.

10. The pleated filter media arrangement of claim 9, said superposed layers of spaced strands of said pleated plastic screening being thermobonded together with facing opposed outer layer portions being spot bonded together to provide communicating fluid flow channels.

11. The pleated filter media arrangement of claim 9, said inner layer of spaced strands of said pleated plastic screening facing said pleated porous filter media being bonded to one face of said pleated porous filter media.

12. The pleated filter media arrangement of claim 9, said outer layer of spaced strands of said pleated plastic screening having spaced strands of greater cross-sectional area than the spaced strands of said inner layer with facing opposite portions of said spaced outer layer strands of said pleated plastic screening being heat bonded together.

13. The pleated filter media arrangement of claim 9, said spaced strands of said outer layer having a cross-sectional diameter at least two times greater than the cross-sectional diameter of said inner layer of spaced strands with the spacing of adjacent spaced strands of each layer of crossing strands being approximately one inch (1") to provide flow-through passages of approximately one inch square (1" sq.).

14. A pleated filter media arrangement for removing particulate matter from a fluid stream comprising;
    a flow through support frame;
    at least one sheet of porous filter media having opposed faces and being pleated into a plurality of longitudinally extending spaced pleats of porous filter media disposed in said flow-through support frame;
    a pair of opposed sheets of longitundinally extending pleated polyvinyl acetate and polypropylene blended flexible plastic screening nestingly engaging said opposed faces of adjacent pleats of porous fiberglass filter median each of said pleated plastic screening sheets comprising at least two inner and outer superposed bonded layers of sets of spaced strands with the sets of spaced strands of one layer being substantially normal to and crossing the sets of spaced strands of the other layer to provide rectangular flow-through passages therebetween of approximately on inch square (1" sq. with the inner layer of spaced strands being smaller and bonded to the opposed faces of said pleats and with facing opposed outer layer portions being larger and abuttingly spot bonded together to provide communicating fluid flow channel along the faces of said pleats of porous filter media, said sets of spaced larger strands of said outer layer each having a cross-sectional diameter of approximately one twenty-fourth of an inch with the cross-sectional diameter of each of said inner layer of strands being approximately in the range of one-tenth (1/10) to one half (1/2) the diameter of each said outer layer of larger strands.

* * * * *